Figure 3:
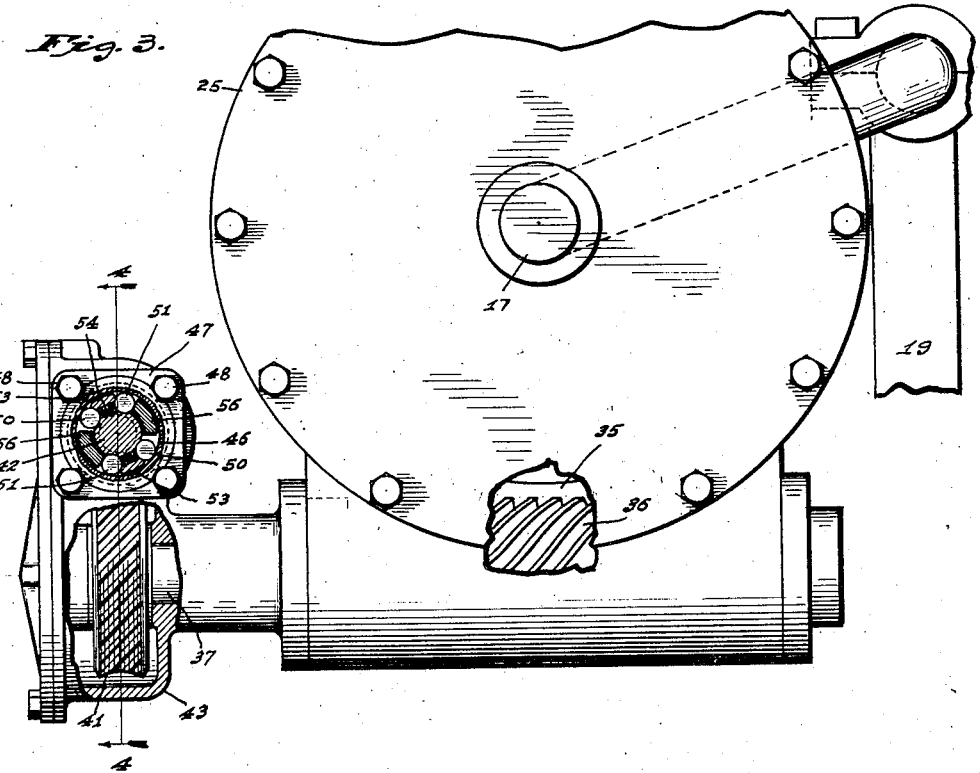

Dec. 17, 1935.  W. A. COST  2,024,994
ROAD GRADER
Filed May 20, 1935   2 Sheets-Sheet 1
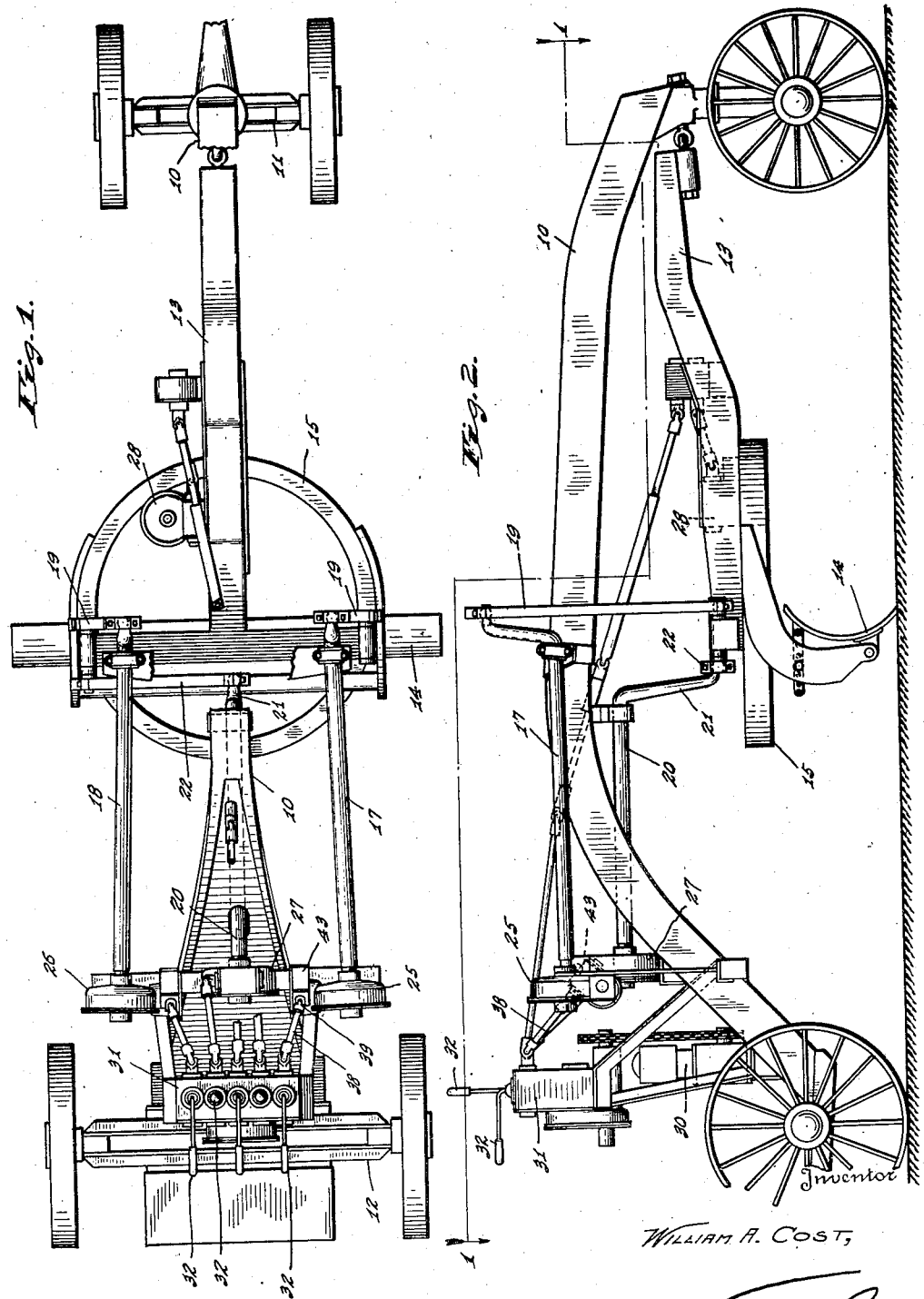
Inventor
WILLIAM A. COST,
By
Attorneys Dec. 17, 1935. W. A. COST 2,024,994
ROAD GRADER
Filed May 20, 1935 2 Sheets-Sheet 2

Inventor
WILLIAM A. COST
By [signature]
Attorneys

Patented Dec. 17, 1935

2,024,994

UNITED STATES PATENT OFFICE 2,024,994

ROAD GRADER

William A. Cost, Indianapolis, Ind., assignor to J. D. Adams Manufacturing Company, Indianapolis, Ind., a corporation of Indiana Application May 20, 1935, Serial No. 22,403

5 Claims. (Cl. 37—156)

In road graders and similar earth-working machines it is customary to effect adjustments of the blade or other earth-working tool through the medium of worm gearing in order to obtain the mechanical advantage necessary in adjusting the relatively heavy movable parts. While worm gearing is nominally irreversible, it is found in practice that the vibration incident to grader operation and the great stresses which the parts are called upon to sustain prevent the worm gearing from being completely irreversible with the result that the adjusting mechanisms frequently creep and change the setting of the adjusted part. In manually controlled road graders, the manually operated member of each adjusted mechanism is usually a wheel of considerable diameter, and any creeping movement of such wheel is readily discernible by the operator who may immediately correct the adjustment.
In graders where the adjustments are effected by power, however, there may be no large manually operated adjusting wheels, and the creeping of any adjusting mechanism is therefore not readily apparent.
It is the object of my invention to provide those adjusting mechanisms of a road grader or similar machine which are subject to creeping with means which will prevent any change in the adjustment except such changes as the operator desires. More specifically, it is my object to secure this result by a mechanism which can be readily incorporated in a grader of any type and which is simple and economical to manufacture.
In carrying out my invention I associate with the adjusting mechanism which is to be controlled a two-way brake which operates between a stationary part of the machine and a rotatable part of the adjusting mechanism, preferably that rotating part which has the highest speed; and I provide mechanism for automatically releasing the brake to the extent necessary to effect any adjustment which the operator desires. In its preferred embodiment, the mechanism is in the form of a two-way roller brake having two pairs of rollers which operate between a stationary collar and a cam carried by the shaft whose movement is to be controlled, the cam and rollers being so arranged that any tendency of the cam to rotate wedges one or the other pair of rollers between it and the collar to prevent such rotation. The adjusting mechanism includes a rotatable driving element coaxial with the cam-carrying shaft, such driving element being provided with fingers located in the plane of the rollers and so disposed that when the driving element is rotated in either direction the fingers will engage and force to retracted and inoperative position those rollers which normally operate to prevent rotation of the cam in that direction.

Figure 4:
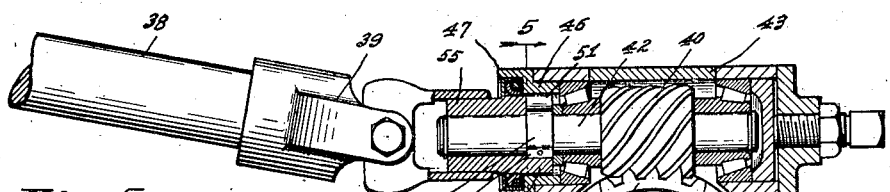
Figure 5:
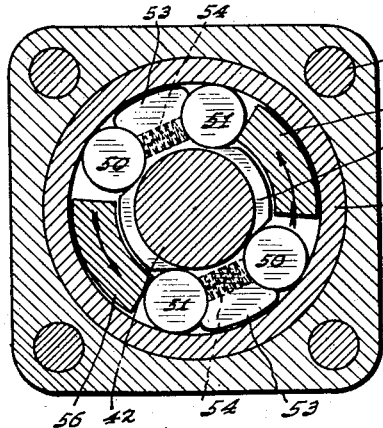
Figure 6:
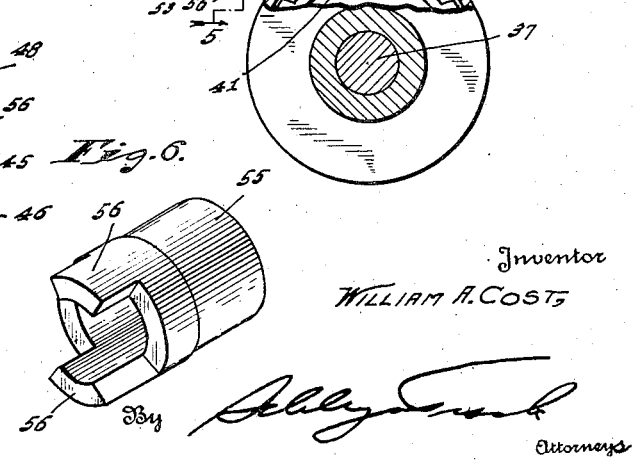

The accompanying drawings illustrate my invention: Fig. 1 is a plan view of a road grader with part of the frame structure broken away as indicated by the line 1—1 of Fig. 2; Fig. 2 is a side elevation of the road grader; Fig. 3 is an end elevation of one of the grader adjusting mechanisms with which my invention is associated, with parts of the gear casing broken away to illustrate the interior construction; Fig. 4 is a fragmental vertical section on the line 4—4 of Fig. 3; Fig. 5 is a transverse section on the line 5—5 of Fig. 4; and Fig. 6 is an isometric view of the element which drives the adjusting mechanism.

The grader illustrated in the drawings comprises a main frame 10 supported at its opposite ends on front and rear wheel-supported axles 11 and 12. Connected through a universal connection to the main frame 10 near the front end thereof is a draw-bar 13 to which the blade 14 is attached through the medium of a circle 15 which is rotatable on the draw-bar to vary the angle between the blade and the longitudinal centerline of the machine. As is customary in graders of this type, means are provided for securing independent vertical adjustment of opposite sides of the draw-bar 13 at its rear end and for shifting the rear end of the draw-bar transversely of the machine.

In the machine shown in the drawing, vertical adjustment of the rear end of the draw-bar is secured by the rotation of lift arms 17 and 18 having at their front ends cranks connected by lift-links 19 with transversely spaced points at the rear end of the draw-bar. Transverse movement of the rear end of the draw-bar is under the control of a shaft 20 having at its front end a crank 21 connected by a link 22 to the rear end of the draw-bar. As previously indicated, the adjustments of the blade 14 are usually secured through worm gearing, several sets of which are shown in the drawings. The lift arm 17 is rotated by means of worm gearing contained in a casing 25 suitably supported from the frame 10 near the rear end of the machine. Similar worm gearing contained in a casing 26 on the opposite side of the machine effects control of the lift arm 18. A third set of worm gearing, in a casing 27, rotates the shaft 20; and a fourth set, contained in the casing 28 mounted on the draw-bar 13, regulates the position of the circle 15.

The machine may include other adjusting mechanisms for effecting additional adjustments; but as my invention is not concerned with the particular adjustment effected, the adjusting mechanisms so far referred to will be adequate to indicate the nature of my invention and its application. The various adjustments, irrespective of their number, are effected by means of power derived from a small engine 30 which may be operatively connected to any of the adjusting mechanisms through suitable gearing and clutches disposed in a control box 31 and under the control of a series of control levers 32, one for each of the adjusting mechanisms. My present invention is not concerned with any details of the arrangement of the parts within the control box, which may conveniently be constructed in accordance with the disclosure of my co-pending application Serial No. 661,442, filed March 18, 1933.

For purposes of illustration, I have shown my invention as associated with the adjusting mechanism which controls the position of the lift arm 17 and the rear right-hand corner of the draw-bar; but it is to be understood that it can be associated with any other adjusting mechanism which the grader embodies. Referring to Fig. 3, I have shown the lift arm 17 as provided within the casing 25 with a worm gear 35 meshing with a worm 36 rigid with a worm-shaft 37. Power for rotating the worm-shaft 37 is derived from a shaft 38 which extends from the control box 31 and is connected through a universal joint 39 and helical gears 40 and 41 to the shaft 37.

The spiral gear 40 is rigid with a shaft 42 which is rotatably supported in suitable bearings in an enclosing casing 43 carried by the housing 25. The shaft 42 carries near its rear end a two-lobed cam 45 disposed within a stationary collar 46 secured to the casing 43 as by being provided with a flange 47 held in place by screws 48. At the clockwise face of each lobe of the cam 45 there is disposed within the collar 46 a roller 50, similar rollers 51 being located at the counter-clockwise faces of the respective cam-lobes.

The lobes of the cam 45 are so shaped that upon any tendency of the shaft 42 to rotate one or the other pair of the rollers 50 and 51 will be wedged between the cam and the inner surface of the collar 46 to prevent rotation. Specifically, should the shaft 42 tend to rotate in a clockwise direction, the lobes of the cam will engage the opposite rollers 50 and, by a wedging action, prevent clockwise rotation of the shaft. Similarly, should the shaft 42 tend to rotate in a counter-clockwise direction, the rollers 51 will be wedged between the lobes of the cam and the inner surface of the collar 46.

In the transverse plane of the cam 45 and midway between the lobes thereof the shaft 42 carries two outwardly extending ribs 53, each of such ribs having rollers 50 and 51 on opposite sides. Each rib may be provided with a hole which extends through it and which contains a compression spring 54 acting on the two rollers on opposite sides of the rib and tending to force such rollers outwardly against the inner surface of the collar 46.

The driving element of the adjusting mechanism illustrated in the drawings is in the form of a sleeve 55 which is rotatable upon the extreme rear end of the shaft 42 and to which the front member of the universal joint 39 is rigidly connected. At its front end, the sleeve 55 is provided with two forwardly extending fingers 56 which overlie the two lobes of the cam 45. The angular extent of each of the fingers 56 is somewhat less than the distance between the two rollers 50 and 51 on its opposite sides, so that the presence of the finger will not interfere with the desired locking action of each of such rollers. As the only operative connection between the driving sleeve 55 and the shaft 42 is through the fingers 56 the rollers, and the ribs 53, the fact that each finger has an angular extent less than the distance between the rollers on either side of it results in a certain degree of lost-motion between the driving element and the shaft.

When the adjusting mechanism is not being operated, the rollers 50 and 51 act as above described to prevent the shaft 42 from rotating under forces transmitted to it from the road grader blade through the lift arm 20, worm-gearing 35—36, and helical gearing 40—41. When it is desired to rotate the lift arm 17 to change the adjustment of the blade 14, the control lever 32 associated with the shaft 38 is operated to connect that shaft to the engine 30. It is to be understood that the gearing within the control box 31 is of such a nature that the shaft 38 can be rotated in either direction under power derived from the engine. Assuming that the shaft 38 is to be rotated in such a direction as to impart counterclockwise rotation to the shaft 42, the fingers 56 will be driven in the direction of the arrows in Fig. 5. As they move in that direction, the fingers 56 engage the rollers 51, which normally operate to prevent counterclockwise rotation of the shaft 42, and force such rollers out of locking position and into engagement with the ribs 53. As rotation of the shaft 38 continues, the shaft 42 is driven in a counter-clockwise direction through the fingers 56, the rollers 51, and the ribs 53. The rollers 50 are ineffective to prevent this rotation, as any friction between them and the inner face of the collar 46 tends to move each roller 50 toward the base of its associated cam-lobe where it is out of locking position. To secure an adjustment in the reverse direction, the control lever 32 associated with the shaft 38 is operated to effect clockwise rotation of the sleeve 55 and the fingers 56 which it carries. Under these circumstances, the fingers 56 will engage the rollers 50 and force them into retracted position against the ribs 53. In either instance, the torque imposed upon the shaft 42 is transmitted through the fingers 56 and one pair of the rollers 50 and 51 to the ribs.

As soon as the adjustment has proceeded to the desired extent, the operator restores the control lever 32 to its neutral position thus stopping rotation of the shaft 38 and sleeve 55. When this occurs, the springs 54 force both sets of rollers 50 and 51 into their respective operative positions where they act to prevent any rotation of the shaft 42 and any creeping in the adjusting mechanism associated therewith.

While it is not essential that the locking device be associated with the shaft 42 rather than with the shaft 37 or even with the lift arm 17, I prefer to associate it with the shaft 42 where, by reason of the mechanical advantage provided by the gearings 40—41 and 35—36, the stresses to which it is subjected will be lessened. Of course, in a case where the train of power-transmitting parts effecting an adjustment includes no speed-reducing gearing it is relatively immaterial where the locking device is located, and it may in some instances be desirable to locate the locking device close to the adjustable part whose position it controls in order to eliminate as far as possible displacement of such part which might occur as the result of lost-motion in the adjusting mechanism or from distortion of the elements of the adjusting mechanism under load.

I claim as my invention:

1. In a road grading machine having an adjustable earth-working implement, an adjusting mechanism for effecting adjustments of said implement, said adjusting mechanism including speed-reducing gearing having a driving shaft, a cam rotatable with said driving shaft and having an outwardly projecting lobe, a stationary collar surrounding said cam, two rollers disposed within said collar on opposite sides of said lobe and adapted normally to be wedged between said lobe and collar to prevent rotation of said driving shaft, abutments rotatable with said shaft and positioned to limit movement of said rollers away from said cam-lobe, a rotatable driving element co-axial with said cam and having a finger overlying said cam-lobe in position to engage either roller and move it into contact with its associated abutment, a source of power carried by the machine, and means for operatively connecting said source of power to said driving element to rotate it in either direction.

2. In an earth-working machine, an adjustable element, an adjusting mechanism for effecting adjustments of said element, said adjusting mechanism including speed-reducing gearing having a driving shaft, a cam rotatable with said driving shaft and having an outwardly projecting lobe, a stationary collar surrounding said cam, two rollers disposed within said collar on opposite sides of said lobe and adapted normally to be wedged between said lobe and collar to prevent rotation of said driving shaft, abutments rotatable with said shaft and positioned to limit movement of said rollers away from said cam-lobe, a rotatable driving element co-axial with said cam and having a finger overlying said cam-lobe in position to engage either roller and move it into contact with its associated abutment, a source of power carried by the machine, and means for operatively connecting said source of power to said driving element to rotate it in either direction.

3. In an earth-working machine, an adjustable element, an adjusting mechanism for effecting adjustments of said element, said adjusting mechanism having a driving shaft, a cam rotatable with said driving shaft and having an outwardly projecting lobe, a stationary collar surrounding said cam, two rollers disposed within said collar on opposite sides of said lobe and adapted normally to be wedged between said lobe and collar to prevent rotation of said driving shaft, abutments rotatable with said shaft and positioned to limit movement of said rollers away from said cam-lobe, a rotatable driving element co-axial with said cam and having a finger overlying said cam-lobe in position to engage either roller and move it into contact with its associated abutment, a source of power carried by the machine, and means for operatively connecting said source of power to said driving element to rotate it in either direction.

4. In an earth-working machine, an adjustable element, an adjusting mechanism for effecting adjustments of said element, said adjusting mechanism including a rotatable shaft, a stationary member, brake means operating between said shaft and said stationary member and normally effective to prevent rotation of said shaft in either direction, a source of power carried by said machine, a rotatable driving element co-axial with said shaft and having a lost-motion connection therewith, means for operatively connecting said source of power to said driving element, and provisions operative upon rotation of said driving element relative to said shaft for releasing said brake means.

5. In an earth-working machine, an adjustable element, an adjusting mechanism for effecting adjustments of said element, said adjusting mechanism including speed-reducing, gearing having a rotatable driving shaft, a stationary member, brake means operating between said shaft and said stationary member and normally effective to prevent rotation of said shaft in either direction, a source of power carried by said machine, a rotatable driving element co-axial with said shaft and having a lost-motion connection therewith, means for operatively connecting said source of power to said driving element, and provisions operative upon rotation of said driving element relative to said shaft for releasing said brake means.

WILLIAM A. COST.